ary Examiner—Charles D. Miller

United States Patent [19]

Lichty

[11] Patent Number: 4,774,500

[45] Date of Patent: Sep. 27, 1988

[54] DATA COMPACTION METHOD FOR MICROPROCESSOR CARDS

[75] Inventor: Ronald D. Lichty, San Francisco, Calif.

[73] Assignee: Wright Technologies

[21] Appl. No.: 111,981

[22] Filed: Oct. 21, 1987

[51] Int. Cl.⁴ .............................................. H03M 7/30
[52] U.S. Cl. ....................................... 341/95; 235/432
[58] Field of Search ................ 340/347 DD; 364/200, 364/900; 235/432, 441, 492

[56] References Cited

U.S. PATENT DOCUMENTS

| | | | |
|---|---|---|---|
| 4,386,416 | 5/1983 | Giltner | 364/900 |
| 4,560,976 | 12/1985 | Finn | 340/347 DD |
| 4,597,057 | 6/1986 | Snow | 340/347 DD |

Primary Examiner—Charles D. Miller
Attorney, Agent, or Firm—Bierman and Muserlian

[57] ABSTRACT

A data compaction method, for writing data in highly compact binary form in a data storage medium using a microprocessor, compresses serially occurring transaction values in a limited memory space by substituting prefix codes for previously occurring values and for commonly occurring previous values. The previous values are listed and updated on tables by the microprocessor so that they are indexed to the prefix codes adaptively to changing local values and changing common values over time. The data compaction method is particularly suitable for an account card having a limited, non-erasable memory used in an automated transaction terminal for maintaining an account record of transactions in frequently recurring amounts. A postage metering terminal is operated by the account card, in which an initial balance has been written and each purchase of postage is recorded. A current balance is recomputed by parsing the previously recorded data. If the current balance is sufficient, the requested value is recorded in compressed form in the card memory, and the terminal is operated to print or dispense the requested postage.

17 Claims, 10 Drawing Sheets

MONETARY WORD LAYOUT

| 31 | 30 | 29 28 | 27 | ... | 0 |
|---|---|---|---|---|---|
| V | K | KA | P | DATA | |

FIG. 3A

INITIAL VALUE OF WORD

| 31 | 30 | 29 | 28 | 27 | ... | 0 |
|---|---|---|---|---|---|---|
| 1 | 1 | 1 | 1 | 1 | 1...1 | 1 |

FIG. 3B

INITIAL OR CURRENT VALUE OF CARD

| 31 | 30 | 29 28 | 27 | ... | 18 17 | 16 15 | ... | 0 |
|---|---|---|---|---|---|---|---|---|
| V | K | KA | P | OPTIONAL: IN-ZIP CONSOLE # | Z Z | 16 BITS: DATE IN GREGORIAN | | |

| 31 | 30 | 29 28 | 27 | ... | 0 |
|---|---|---|---|---|---|
| V | K | KA | P | 9-DIGIT ZIP CODE IN BINARY | |

| 31 | 30 | 29 28 | 27 | 25 | 19 | ... | 0 |
|---|---|---|---|---|---|---|---|
| V | K | KA | P | CURRENCY TYPE | | 20 BITS: UP TO $10,000.00, IN BINARY | |

FIG. 3C

SERIES OF POSTAGE IMPRESSIONS

| 31 | 30 | 29 28 | 27 | ... | 0 |
|---|---|---|---|---|---|
| V | K | KA | P | (DATA STREAM, RECORDING EACH IMPRESSION IN OPTIMUM COMPACTED FORM) | |

FIG. 3D

| SERIES OF PURCHASE VALUES | |
|---|---|
| (1) | 22¢,22¢,22¢,22¢,39¢,39¢,22¢,→ |
| (2) | 39¢,39¢,39¢,39¢,39¢,39¢,22¢,22¢,72¢,39¢,72¢,→ |
| (3) | 22¢,→ |
| (4) | 22¢,22¢,22¢,22¢,22¢,22¢,22¢,22¢,22¢,22¢,$2.76→ |
| (5) | 22¢,39¢,39¢,$2.76,$2.76,72¢......... |

FIG. 8A

COMPACTION CHOICES FOR POSTAGE IMPRESSIONS

| Code | Bits | Meaning |
|---|---|---|
| 0 | 1 BIT: | REPEAT VALUE OF PREVIOUS IMPRESSION |
| 1 0 | 2 BITS: | REPEAT MOST COMMON PREVIOUS VALUE |
| 1 1 0 | 3 BITS: | REPEAT 2nd MOST COMMON PREVIOUS VALUE |
| 1 1 1 0 | 4 BITS: | NEXT 7 BITS ARE VALUE (UP TO $1.27) |
| 1 1 1 1 0 | 5 BITS: | REPEAT 2nd-TO-LAST DIFFERENT VALUE |
| 1 1 1 1 1 0 | 6 BITS: | REPEAT 3nd-TO-LAST DIFFERENT VALUE |
| 1 1 1 1 1 1 0 | 7 BITS: | NEXT 10 BITS ARE VALUE (UP TO $10.23) |
| 1 1 1 1 1 1 1 0 | 8 BITS: | REPEAT 3rd MOST COMMON PREVIOUS VALUE |
| 1 1 1 1 1 1 1 1 0 | 9 BITS: | REPEAT 4th MOST COMMON PREVIOUS VALUE |
| 1 1 1 1 1 1 1 1 1 0 | 10 BITS: | REPEAT 5th MOST COMMON PREVIOUS VALUE |
| 1 1 1 1 1 1 1 1 1 1 0 | 11 BITS: | REFILL: NEXT 2-3 WORDS GIVE NEW CURRENT VALUE |
| 1 1 1 1 1 1 1 1 1 1 1 0 | 12 BITS: | REPEAT MOST COMMON PREVIOUS VALUE OVER $1.27 |
| 1 1 1 1 1 1 1 1 1 1 1 1 0 | 13 BITS: | NEXT 14 BITS ARE VALUE (TO $163.83) |

FIG. 4

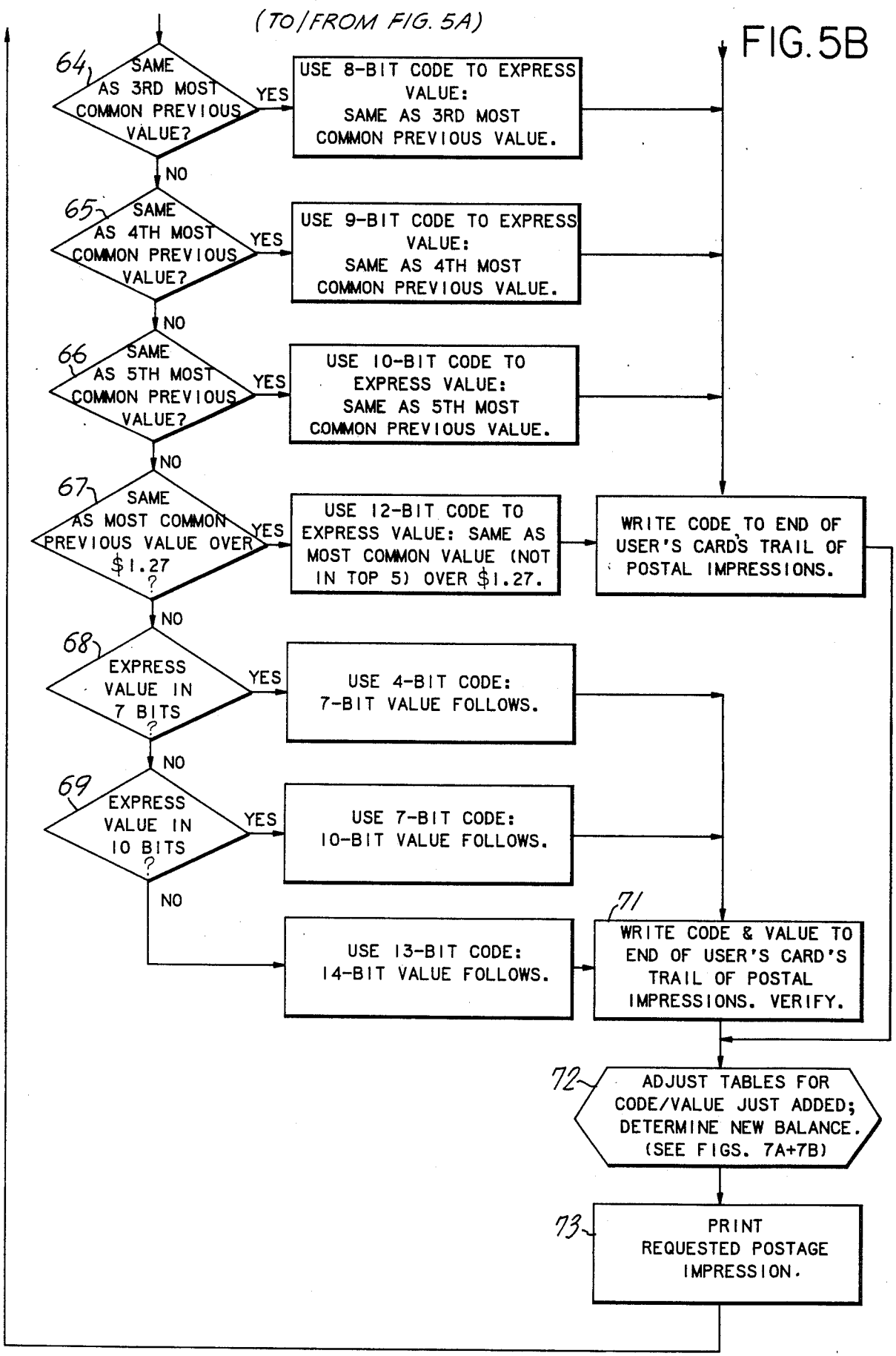

DATA COMPACTION METHOD FOR MICROPROCESSOR CARDS

FIELD OF INVENTION

The invention relates to a data compaction method for writing data in highly compact binary form in a data storage medium using a microprocessor. In particular, the invention is directed to data compaction in an account card having a limited memory used in an automated transaction terminal for maintaining an account record of transactions debited in a relatively finite set of recurring numerical amounts. In one preferred embodiment, the invention is applied to a postage metering system in which a postage transaction record is maintained in the account card for purchases of postage from a metering terminal.

BACKGROUND OF INVENTION

Automated transaction terminals have been widely used in conjunction with various types of account cards issued to users for purchase or credit transactions. In most systems, the account or credit card allows the user to access a central system maintaining the user's bank account or authorizing a credit transaction through a terminal. A useful development in account cards has been to incorporate a magnetic, semiconductor, or optically written memory for storing account information, current balances, or other user information in the card itself. Such memory cards allow the user to access distributed terminals for off-line transactions, by reading and/or updating the stored information, without needing to have the transaction validated through a central system. A further development is an account card having a memory and its own microprocessor with an internally stored program for securing the data recorded in memory and controlling access to use of the card to an authorized user and/or for authorized transactions.

Account cards having on-board memories can be made secure against data tampering by using a storage medium which is non-erasable, i.e. data is written once on the card and cannot be erased or changed. For example, an EPROM circuit can be permanently written electrically, or an optical record medium can be burned in by laser writing. This requires permanent memory space to be designated on the card, and therefore such memory cards can be used to record data only a limited number of times. In order to extend the number of times or transactions for which a card can be used, it is desirable to store data on the card in a highly compact form.

Account cards having non-erasable memories typically have an initial balance which is permanently written on the card and a transaction memory zone where successive transaction records are stored. If a relatively large initial balance is provided, and the transactions occur as a large number of relatively small purchase amounts, then debiting successive transaction amounts and storing a new balance with each transaction would fill the transaction memory zone rather quickly. Data can therefore be more effectively compacted in such cases by storing the transaction amounts themselves, and using the computing power of a microprocessor for the terminal or incorporated on the card itself to compute the current balance, by subtracting all recorded transaction amounts from the initial balance, with each requested transaction.

Purchase transactions typically span a wide range of values, e.g. from a few cents to hundreds of dollars. The binary records of these values must be able to accomodate the largest allowed amount which is to be recorded in one data record. Thus, an efficient data compaction scheme for account cards with limited memory space would minimize the extent of unused bits in the data records by using shorter binary words for the lesser numerical values. Also, for some types of purchase transactions, there may be certain values which occur frequently. For example, in postage purchase transactions, the most frequently used values might be 22 and 39 cents, for one and two ounce First Class mail, or $4.40 for a book of stamps, or the standard charges for other postal services. For such applications, it would be desirable to replace frequently recurring values with shorter codes.

Data compaction methods can be divided into two approaches: logical compression and physical compression. In logical compression, the most efficient representation is found for the particular type of data to be recorded. In physical compression, patterns or recurrences in the original data are coded or otherwise represented in a more compact form. Physical compression can be divided into two types: reversible compression, also known as noiseless coding or redundancy reduction, can be uncompressed back to the original data; and irreversible compression, also known as fidelity reducing or entropy reduction, is more compact but suffers from some data loss upon uncompression. Where exact numerical records of transactions are to be maintained, physical compression of the reversible type must be used. Data compaction methods which use one or a combination of these approaches are discussed below.

One known data compaction method is variable-field binary storage wherein words of different bit lengths are stored in data fields of different record lengths. Thus, shorter words, i.e. low numerical values, can be stored in a data field of lesser bit length than other fields storing higher numerical values, thereby saving the otherwise unused bits of the shorter words. However, additional bits are required in order to designate the selected data field lengths. Alternatively, a number of different data blocks can be designated to store words in different categories of word lengths. However, where the numbers and lengths of the data are not known beforehand, it is difficult to predict what capacity each block should have in order to accomodate the data efficiently. Inevitably, one block will become full before the others. In either case, the amount of memory space saved is relatively small.

A value encoding method can be used if all values which might possibly be stored are known beforehand and make up a small enough set. Then the data can be represented by shorthand codes indexed to a lookup table of the known set of values. However, this method becomes inefficient if the set of values is large and/or if the elements of the set are changed over time. An alternative method is to dynamically generate a table of values, by starting with an initial table having a limited set of indices, and providing an "escape" index to another table if the first table becomes filled. However, the tables may become filled with seldom used or outdated values, and frequent escapes to other tables may be required. A large number of indices can be coded more efficiently by dividing them into groups of defined word lengths, but this would require knowing the likely values and the groupings of the indices beforehand.

Run length encoding, or recurrence coding, provides for compression of values which are repeated, by coding with a single bit or low number of bits the occurrences repeating serially after the starting value. However, this requires the starting value to be written as a full fixed length word and an escape index to denote the end of the repeating series. If different values repeat interspersedly, rather than serially, the compression obtained by this method is relatively limited. Relative or delta (difference) encoding is used to compress data which are relatively similar in value. However, where the values can vary widely with each occurrence, or where the difference between adjacent values is comparable to the values themselves, only a low compression efficiency is obtained.

Universal or adaptive coding can be used to produce optimum indices for tables used to convert variable length strings of data into fixed length words upon uncompression. However, universal coding depends upon strings of data, rather than serially entered, single values, and requires large character strings to achieve its maximum efficiency.

Statistical encoding uses shorter indices to represent frequently occurring values and longer indices to represent less frequently occurring values. For example, Shannon-Fano coding methods order data values by the number of occurrences, then divide the values into branching subsets, assigning indices with an increasing number of bits as the frequency decreases. Huffman coding methods count the number of occurrences of each value, then treat the numbers as nodes which are summed to the next larger nodes in a branching tree structure, and assign binary bit indices according to the path taken to reach the value. However, statistical encoding methods generally require assessing the frequencies of the values beforehand, e.g., by looking ahead at all of the data to be written prior to compression. They are thus not well suited for transactions where each value is to be compressed and recorded serially with each transaction, where the frequencies of the values are not known beforehand, or where the frequently occurring values may change over time.

SUMMARY OF INVENTION

In view of the foregoing disadvantages and limitations of the known methods, it is a primary purpose of the invention to provide a data compaction method, and system implementing the same, for compressing with high efficiency serially occurring data which may have frequently recurring values or which may have recurring values which change over time. It is a particular object of the invention that the compression method be readily adaptive to changes in values and frequencies of occurrence on a dynamic basis, i.e. locally with each transaction or set of transactions. A specific object is to provide a data compaction method particularly suitable for compressing data in binary form in a limited memory space on an account card which is used in an automated transaction terminal, especially as applied to postage purchase transactions.

In accordance with the purposes and objects of the invention, a data compaction method, for compressing serially occurring transaction values in a limited memory space consisting of a plurality of word spaces of a predetermined bit length, employs a defined set of prefixes (indices) which point to the currently occurring value, and to previously occurring values and most commonly occurring previous values, which are parsed from a previously recorded transaction data stream and listed on tables, and then processes each serially occurring transaction value by recording the most efficient prefix determined by the tables to represent the currently occurring value. The prefixes and necessary values are recorded at the end of the serial data stream from one word space to the next using a bit configuration which allows the recorded data to be uncompressed accurately and efficiently.

The data compaction method of the invention generally comprises the following basic steps:

(1) assigning a first prefix indicating a most recent previously occurring value;

(2) assigning a second prefix indicating a most common previous value;

(3) assigning a third prefix indicating a given number of bits allocated to binarily encode a currently occurring value; and (4) serially recording each currently occurring value by adding data to a serial data stream recorded in said memory space from one word space to the next by:

(5) parsing the recorded serial data stream according to each serially recorded prefix and value so as to reconstruct the previous values, to list a most recent previously occurring value on a first table, and to list a given plurality of common previous values, including a most common previous value, with a count of the number of occurrences for each such value, on a second table; and (6) representing the currently occurring value in the serial data stream by: (a) recording the third prefix and the currently occurring value in the given number of bits, if the currently occurring value is different from the most recent previously occurring value listed on the first table and common previous values listed on the second table; (b) recording the first prefix only if the currently occurring value is the same as the most recent previously occurring value of the first table; and (c) recording the second prefix only if the currently occurring value is the same as the most common previous value listed on the second table.

In the preferred embodiment of the invention, the data compaction method is used to record serially occurring purchase transaction values, for example, postage purchases. A user account card, provided with an initial balance written in memory, is inserted in a postage metering terminal, and once the user is validated, a current balance is computed by the terminal by parsing the initial balance and the recorded transaction data stored in the card to reconstruct the previous purchase values and subtract them from the initial balance. At the same time, the first and second tables are listed. If the computed current balance permits a purchase in the amount requested, the currently occurring value is recorded in the card memory using the proper prefix determined from the table listings, and the terminal then prints or dispenses the requested postage.

The memory space of the card is initialized to all binary "1" bits. The preferred set of prefixes are selected to be mostly "1"s in order to minimize the recording operation, since most bits are expected to remain "1". The prefixes are constituted by "0", "10", "110", et seq., each as a series of "1" bits ending with a "0" bit. Parsing is facilitated since each prefix is identified by an end "0". Thirteen prefixes are assigned as follows: "0" for the most recent previously occurring value; two other prefixes of increasing bit length for the second and third different, previously occurring values, which are also listed on the first table in push-down mode; "10" for the most common previous value; "110" for the second most common previous value; three other prefixes of increasing bit length for the third, fourth, and fifth most common previous values, which are also listed and counted on the second table; "1110" to indicate that the next given number of bits are used to record a currently occurring value which cannot be represented by a prefix for a previous value; and four prefixes are reserved for values of higher, less frequent numerical amounts, of respectively defined, longer bit lengths, and for setting a new initial balance.

The method according to the invention provides for highly efficient data compaction by the use of shorter bit-length prefixes in place of values which are recurrences of previous values. Each currently occurring transaction value is represented and recorded serially in the most efficient compressed form by adding to the previously recorded data stream. The use of the first table allows substitution of the shorter prefixes for the more recent recurring values, whereby the method dynamically adapts to recurrences in a local set of transactions. The use of the second table allows the substitution of prefixes for the most common previous values which are counted during parsing of the recorded transaction record. Thus, if the most common values change over time, the tables become changed so that the prefixes currently refer to the new most common values.

The above principles, advantages, and features of the invention are described in further detail below, in conjunction with the following drawings.

BRIEF DESCRIPTION OF DRAWINGS

FIGS. 3A, 3B, 3C, 3D show the layout of word spaces to be written with compacted data in a repesentative memory zone;

FIG. 4 is a listing of a preferred set of prefix codes in accordance with the invention;

FIGS. 5A and 5B show the Data Compaction Routine in further detail;

FIG. 8A depicts an example of a series of postal purchases;

DETAILED DESCRIPTION OF INVENTION

In accordance with the principles of the invention, a data compaction method is used to record serially occurring transactions of frequently recurring values in a limited memory space. The method is preferably used in a system where account cards having on-board memories are issued with initial balances to authorized users for off-line transactions at remote terminals. The user's balance is derived from data securely recorded in and read from the card's memory, and does not need to be validated through a central account system. For applications in which a large number of purchase transactions are made in relatively small amounts, the method provides for storing a series of transaction values, rather than each new balance, in order to save memory space. The current balance is then recomputed with a requested transaction by reconstructing the previous values from the recorded data and subtracting them from the initial balance. If the balance indicated in the card is sufficient for a requested purchase, the terminal operates to provide the article or item of value, and a record of the new purchase value is permanently recorded in the card's memory.

The preferred embodiment of the invention described below employs a memory card in an automated postage metering terminal to record postage purchase amounts. However, it should be understood that the invention is equally applicable to other forms of serially entered data having frequently recurring values, besides monetary amounts for postage transactions. For example, the invention may employ a telephone account card to record telephone numbers called and the dates, as well as the phone charges. In that case, the prefixes and tables of the invention would be used to code frequently called numbers and calls. Alternatively, the invention may be applied to other forms of memory (magnetic, optical, punched media) incorporated in other carriers (keys, boards, sheets, markers) and used in registers, office equipment, vehicles, or appliances, to record stock numbers, dates, addresses, quantities, customer numbers, user ID numbers, service information, etc.

Figure 1:
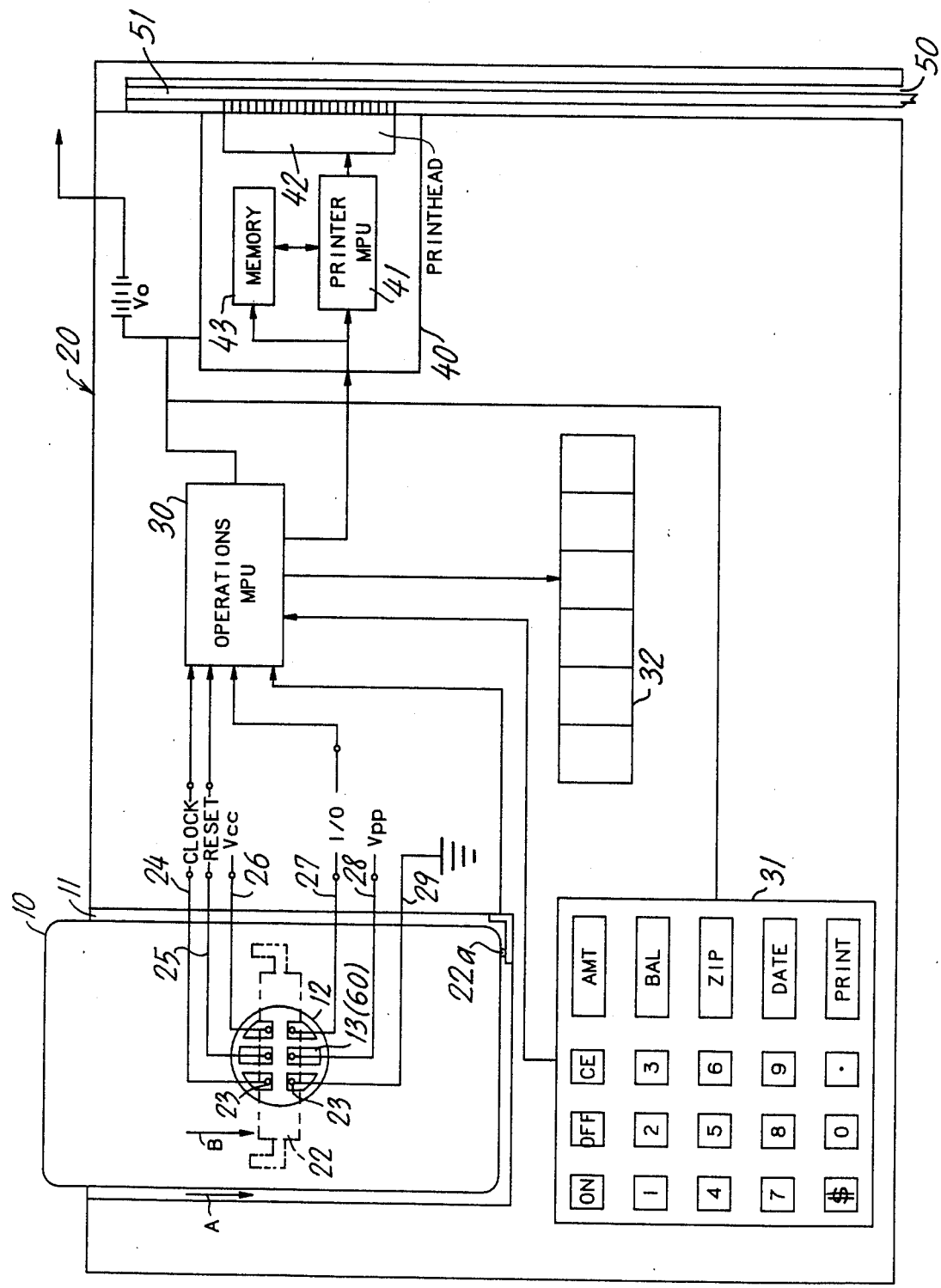
FIG. 1 illustrates schematically an automated transaction terminal and account card to be employed in accordance with the data compaction method of the invention.

Referring to FIG. 1, a postage metering system employs memory card 10 which is inserted in slot 11 of postage metering terminal 20. Card 10 is preferably of the type having its own resident microprocessor. For example, Micro Card Technologies Inc. of Dallas, Tex., makes the Micro Card Mask M4 card which is a standard (ISO) size, similar to a credit card, having a microprocessor, 8 contact pinout, 9600 bps asynchronous serial exchange protocol, 12.8 Kbits of Read-Only Memory (ROM), 288 bits of Random Access Memory (RAM), and 8 Kbits of Electrically Programmable ROM (EPROM). The EPROM is a non-erasable memory, however, erasable, dynamic, or other types of card memories may be used as long as its security can be maintained.

The microprocessor card 10 as used in the invention operates by executing an internally stored program (firmware) which cannot be accessed from the outside. The internal firmware assures that data is written to and retrieved from the card only in accordance with the security procedures required by the card. The EPROM memory portion is divided into zones, including a secret zone which can only be accessed internally; a protected transaction zone which can only be accessed after a key number or the user's personal identification number (PIN) has been confirmed, and a free-reading zone. Purchase transactions are executed by card 10 interactively with terminal 20, which has an operations MPU 30 including a RAM memory for controlling purchase operations as described further herein. Alternatively, card 10 can have only an EPROM or other form of passive memory, and purchase transactions, including reading from and writing transaction data to the card, can be performed exclusively under control of terminal 20, or the card may have an MPU of sufficient power and memory space to control the purchase transactions exclusively.

When the microprocessor cards are issued to individual users, a validation procedure is executed on a validating terminal. The procedure generally requires the issuer to enter the correct manufacturers' assigned key number in order to confirm that the card is authorized. A PIN is then assigned to or selected by the cardholder and stored in the secret zone. Upon cmpletion of the validation procedure, the card MPU irreversibly alters its program so that the words written in the secret memory zone cannot be altered. Thereafter, upon using the card, a user must enter the correct PIN in order to confirm that the card is being used by its authorized user. Conventional microprocessor cards also have the feature of temporarily or permanently locking the card from use if a succession of incorrect PIN entries is detected.

At the time of issuance, an amount in monetary or other units is validated for the card being issued. In conventional cards, the amount is permanently written in a locked sector of the protected transaction memory zone. Each time the card is to be "filled" with a new amount, another sector is written with the new amount. Thus, a limited authorized amount can be written each time a sector is initiated, and the card can be refilled a number of times before its memory space is used up. This is a security feature to minimize monetary loss in case the card is lost or stolen.

In the preferred embodiment, card MPU 60 stores the amount of each transaction in the transaction memory zone, rather than storing each new balance. The current balance is recomputed by the terminal operations MPU 30 from the initial authorized amount and the stored history of transaction values at the time a transaction is requested. This procedure substitutes the microprocessor's computing power to save a significant amount of card EPROM memory space, since the individual transaction values are generally quite small in relation to the balance.

Card 10 has a contact section 12 which has a number of contacts 13 connected to the pinout leads of an IC chip including a microprocessor unit (card MPU) 60 laminated beneath a protective layer of the card contact section 12. Contacts 13 mate with corresponding contacts 23 of terminal contact section 22 upon insertion of card 10 into slot 11 in the direction indicated by arrow A. As the card is inserted, its leading edge abuts a part of terminal contact section 22 which is moved in the same direction, indicated by arrow B, so as to merge in operative electrical contact with contact section 12. A trip switch 22a is provided at the base of slot 11, and triggers a start signal to the terminal MPU 30 when the card has been fully inserted in position in the slot.

Terminal contacts 23 are connected to the functional parts of the terminal, including a Clock synchronizing connection 24, a Reset connection 25, an operational voltage Vcc connection 26, an Input/Output (I/O) port 27, an EPROM-writing voltage Vpp connection 28, and a ground connection 29. The terminal MPU 30 controls the interface with the card and the operation of the various parts of the terminal, including keyboard 31, display 32, and printer 40 which prints the postage purchased from the terminal on an envelope or label. A power source Vo is provided by a battery and/or an external AC or DC line to power the various parts of the terminal.

The printer 40 has a microprocessor unit (printer MPU) 41 which individually and uniquely controls the operation of a print head 42, such as an electrothermic or impact print head. MPU 41 executes an internal program (firmware), like the card microprocessor, so that it cannot be tampered with from the outside. MPU 41 is also formed integrally with the printhead 42, such as by embedding in epoxy or the like, so that it cannot be physically accessed without destroying the printhead.

The interactive operation of the card/terminal system will now be described. Upon inserting card 10 in slot 11, trip switch 22a is triggered, and terminal MPU 30 initiates a PIN request procedure to confirm that the card is being used by an authorized user. For example, terminal MPU 30 may cause a prompt to appear on display 32 requesting that the user enter a PIN. The number entered by the user is sent to the card MPU 60 where it is checked against the PIN number(s) stored in the secret zone of the card's memory. If the number matches, the card MPU notifies terminal MPU 30 to proceed.

Terminal MPU 30 next prompts the user to enter information for a postage transaction. The user inputs on keypad 31 the amount of postage requested, and it is displayed on display 32 for confirmation. When all the correct information has been entered, an edge of an envelope 51 to be mailed, or a label or mailing form to be attached to an item to be mailed, is inserted in slot 50 on one side of postage metering terminal 20. The label or envelope is brought in registration with printhead 42, and the user then presses the "Print" key to initiate a postage purchase transaction.

For a more complete description of a preferred form of automated transaction system using microprocessor cards, particularly as applied to a postage metering system, reference is made to commonly owned U.S. patent application Ser. No. 903,379, filed Sept. 2, 1986, and Ser. No. 935,244, filed Nov. 26, 1986, of Christopher B. Wright and Stephen Bristow. The remainder of this description is directed particularly to the data compaction method of this invention and system for implementing the same.

Figure 2:
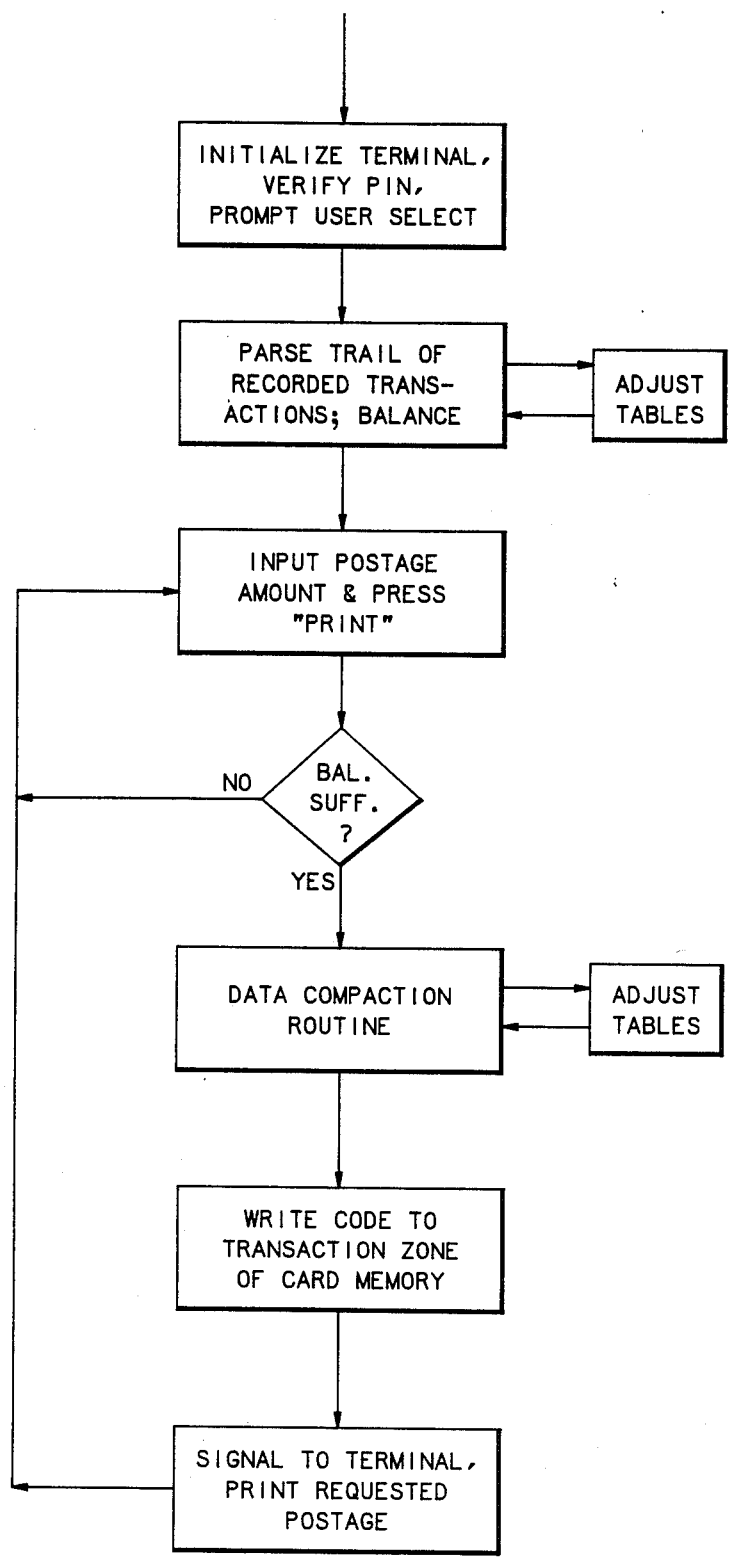
FIG. 2 is a flow diagram of the overall data compaction method applied to the system of FIG. 1.

A basic sequence of operations executed by card MPU 60 and/or terminal MPU 30 is shown in FIG. 2. The terminal program proceeds by initialization of the terminal, checking the user's entered PIN code with the PIN stored in the card, and prompting the user for a transaction selection and related information. At the same time, the recorded trail of transaction data in the transaction zone of the card's memory is parsed to serially reconstruct the previous transaction amounts, using a Parsing Subroutine described further herein, and tables listing recent previous values and most common previous values are contemporaneously adjusted using an Adjust Tables Subroutine. As the previous values are derived, the amounts are subtracted from the initial authorized amount to compute the available balance. At the end of parsing the recorded trail, the tables have been updated and the current balance determined. The user is then prompted on the terminal to input the requested postage amount, and other data, and press the "Print" key to execute the requested transaction.

If the current balance covers the requested postage amount, the card MPU compresses the currently requested value in accordance with the data compaction method described further herein, adjusts the tables, then writes the compressed code at the next position of the data trail in the transaction zone of the card's memory. Since writing in EPROM is non-erasable, the card balance is effectively debited. The card MPU then provides a signal to the terminal to proceed with printing the requested postage. The procedure then returns to the postage amount input step for the next postage request. If the available balance is not sufficient for a requested amount, the procedure returns to the input step without writing in the card's memory or printing the postage.

FIGS. 3A-3D illustrate the layout of word spaces in the transaction zone of the card's memory. Referring to FIGS. 3A and 3B, each word space consists of a given number of bits, e.g. 32 bits in the case of the Micro Card M4. The manufacturer provides the card with all words initially binary "1"s. The leftmost four bits, numbered 31, 30, 29, 28, of each word space are reserved for housekeeping codes. The "V" bit is a validation bit which, if written to "0", prevents any further writing in that word space. The "K" and "KA" bits define the type of user writing in the word space; for example, "01" could indicate writing by a card user, while "11" indicates a card issuer such as the Postal Service or a private carrier. The "P" bit is defined as a parity bit to guard against erroneous writing or reading of data.

The data area of each word space, numbered 27 to 0, is the area where transaction data is recorded in a serial stream of optimally compacted codes, as shown in FIG. 3D. If a code has more bits than is available in the current word space, the leftmost bits are written to fill the current word space, and the remaining bits are carried over to the next word space starting with bit 27. When a word space is filled, its "K", "KA", and "P" bits are set appropriately, and the "V" bit is zeroed to prevent further writing to that word space. Referring to FIG. 3C, the first three word spaces of the transaction zone are initialized at the time of issuance of the card to record issuer information, such as the number identifying the console from which the card was issued, the date, the extended zip code of the issuer's location (or Post Office branch), currency type, and the initial monetary value validated for the card.

In the method of the invention, a set of prefix codes are defined to point to selected previous transaction values listed on active tables in order to allow substitution of the shorter prefix codes for a currently occurring value which is the same as a previous value. For the described application of postage purchase transactions, thirteen preferred codes are defined, as shown in FIG. 4. The codes range from 1 bit to 13 bits in length and, except for the first code which is "0", consist of a series of "1"s with an end "0" bit. This configuration of codes provides ease of parsing (from the last "0", parsing rightward, counting "1"s until the next "0" is found), minimum writing time, as well as uniqueness (no code is a prefix of another code).

In FIG. 4, the single-bit "0" prefix code is defined to signal a repetition of the previous value. This provides optimal compression for frequently repeated values, i.e., in the case of postage, 22 cent purchases for one ounce mail at the First Class rate. Similarly, the 5-bit code is defined to signal a repetition of the second-to-last previous value different from the last previous value, and the 6-bit code signals the third-to-last different value. When parsing the data stream to derive the available balance of the card, the three different previous values are continually updated by a pushdown and sorting procedure on a Table of Previous Values (also called Previous Table) maintained in the terminal's RAM, so that the prefixes point to previous values updated to the current locality of transactions. For example, in the transaction series 14, 22, 22, 39, 56, 56, the last value is 56, the second-to-last value is 39, and the third-to-last value is 22.

Another set of prefix codes are defined to signal a repetition of previous, most commonly-used values. During parsing, each different value is listed on a Table of Most Common Values (also called Most Common Table) in RAM and a count is maintained of the occurrences of each value. The 2-bit code is defined to signal the most common previous value. Similarly, the 3-bit code is defined to signal the second most common, the 8-bit code the third most common, the 9-bit code the fourth most common, and the 10-bit code the fifth most common previous value. As a rule of construction, a value's frequency does not become more common than another value's frequency until its frequency surpasses the other value's frequency. As an example, in the series 39, 22, 22, 22, 14, 14, 14, 22, 22, 39, 56, 56, the most common value is 22, the second most common value 14, the third most common value is 39, and the fourth most common value is 56.

The 4-bit prefix is an escape code which signals that the next predetermined number of bits are used to record a currently occurring value which is not a repetition of one of the previous values indexed by the above mentioned prefixes. In this example, the 4-bit code is defined to refer to values up to $1.27 which can be expressed in 7 bits. The first threshold bit length is chosen to be high enough to encompass the values expected to occur more frequently, but low enough not to waste space with higher values expected to occur less frequently.

Another escape code is the 7-bit code which signals that the next 10 bits are used to record a value greater than $1.27 up to $10.23, and the 13-bit escape code signals the next 14 bits for values greater than $10.23 up to $163.83. The 12-bit code is used for the next most common previous value over $1.27, because it is shorter than using the 7-bit prefix code followed by a 10-bit value. The 11-bit code signals that a postage refill follows in the next two or three word spaces, starting at the leftmost data bit in the next word space.

Figure 5A:
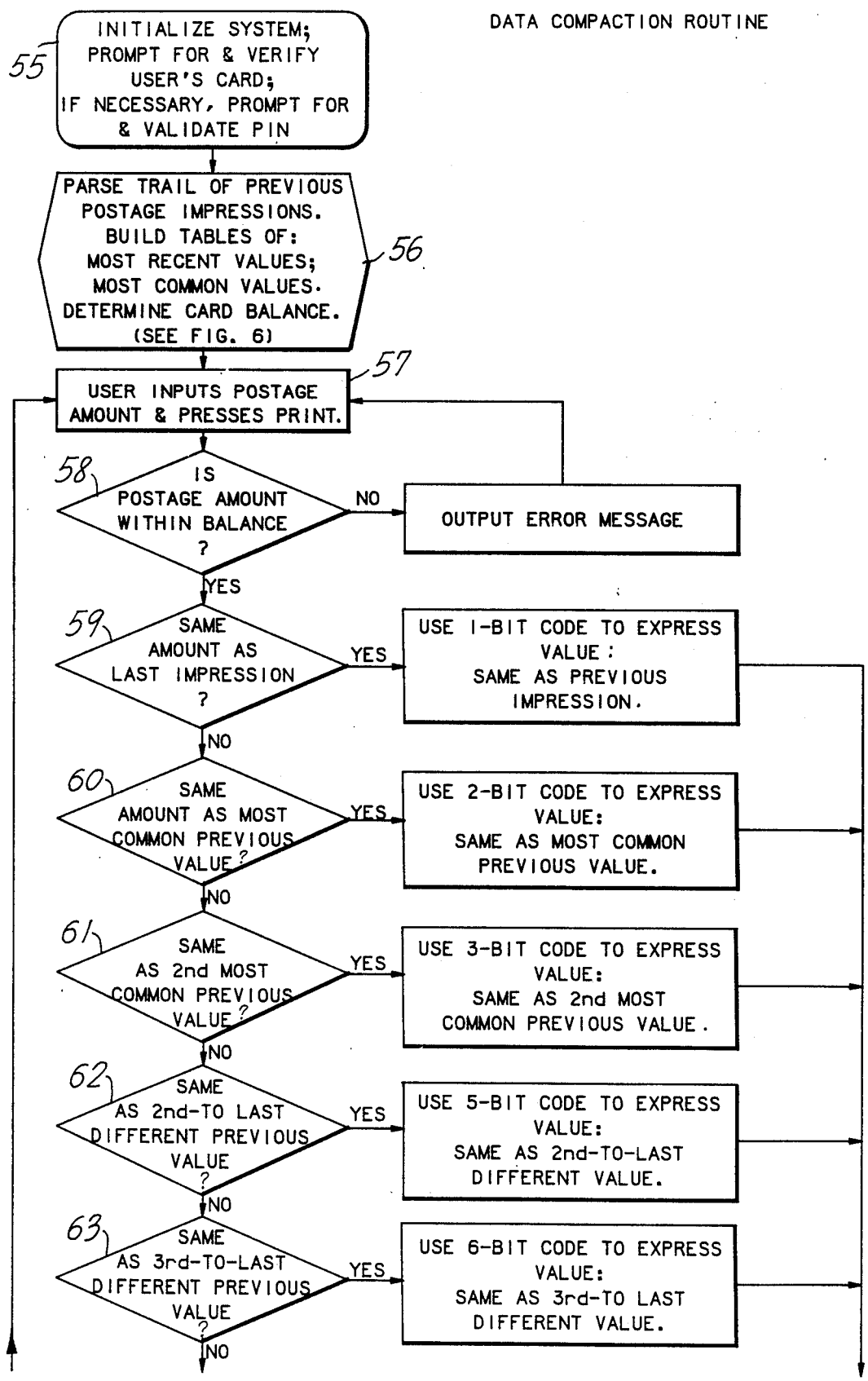

FIGS. 5A and 5B show the Data Compaction Routine in more detail according to the invention. Following initialization of the terminal and validation of the user's PIN at block 55, the Parsing Subroutine is called at block 56 to be performed by the terminal MPU (or the card MPU if it has sufficient computing power and memory space).

Figure 6:
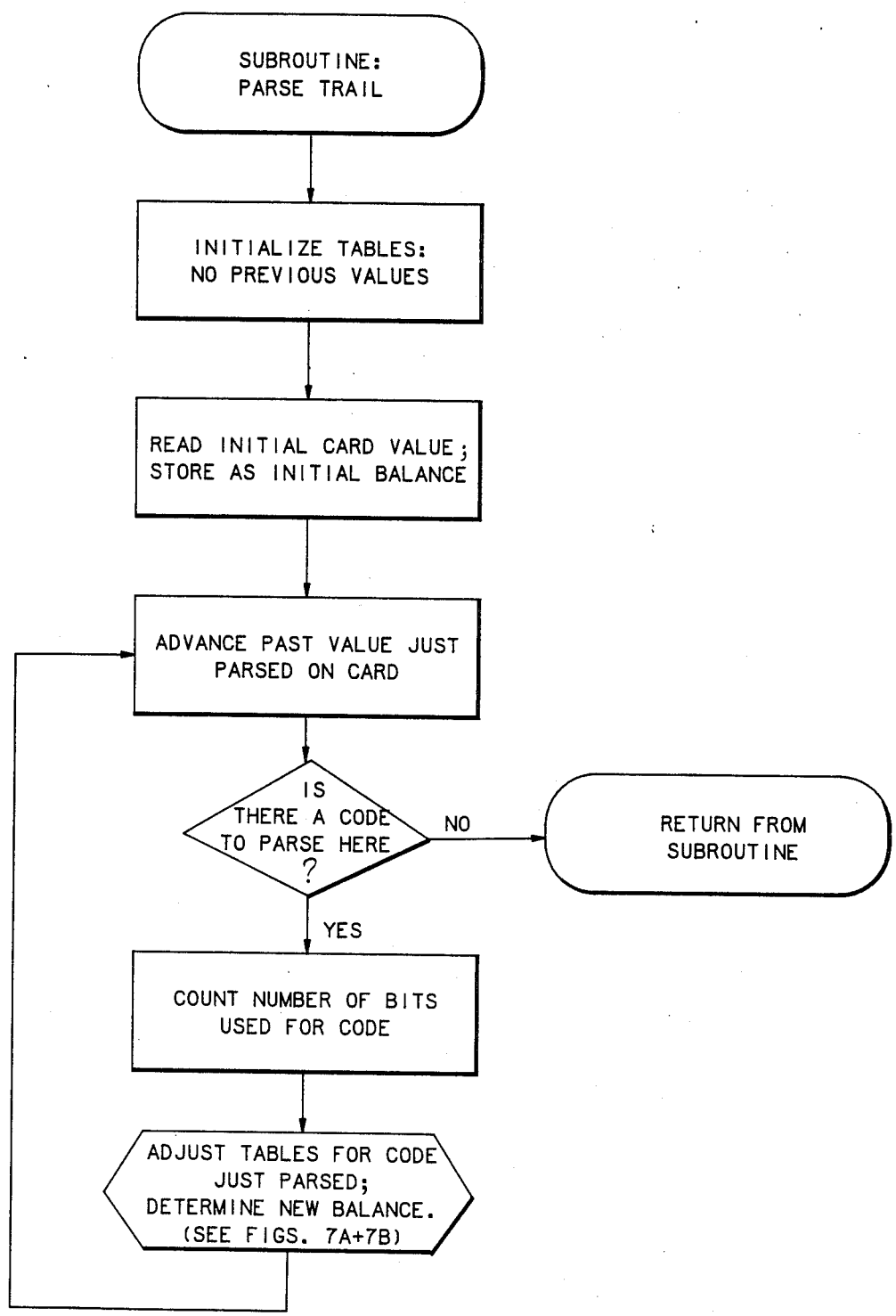
FIG. 6 shows the Parsing Subroutine to the Routine of FIGS. 5A and 5B.

The Parsing Subroutine is shown in FIG. 6, consisting of initializing the Previous Table and the Most Common Table, reading the card's initial value (first three word spaces) and storing the value as the balance, then serially parsing the data trail stored in the transaction zone of the card by finding each prefix code, and decoding its bit length. Once the prefix code is decoded as pointing to a value listed on the tables or to a value recorded in a next given number of bits in the data trail, the procedure then adjusts the tables for the parsed value indicated by the code, using the Adhust Tables Subroutine shown in FIGS. 7A and 7B, and subtracts the parsed value from the available balance to determine the new available balance. The parsing loop is repeated until the data trail is ended, at which point the tables have been adjusted up to the current requested transaction and the card's available balance has been determined, then the processing returns to the Data Compaction Routine.

At block 57 of FIG. 5A, the user inputs the requested postage amount to be purchased and presses the Print key. A check is made at block 58 if the card's available balance is sufficient for the requested amount. If so, the procedure then determines whether the currently requested value is the same as any previous values listed on the Previous Table or the Most Common Table, shown in blocks 59–67. If a match to an indexed previous value is found, the proper prefix code is used in substitution of the currently requested value, and is written at the end of the data trail to record the purchase of the requested amount.

If no match to an indexed previous value is found, the procedure checks whether the currently requested value can be expressed in 7, 10, or 14 bits, at blocks 68–69, and writes the appropriate prefix code, followed by the current value expressed in the corresponding number of bits, at the end of the data trail. The tables are then updated for the currently requested amount, at block 72, a signal is sent to the terminal to proceed with printing the requested postage impression on the envelope or label inserted in slot 50 of the terminal, and processing returns to block 57 for input of the next purchase request. The current balance and the tables continue to be updated with each transaction during the same session on the terminal.

Figure 7A:
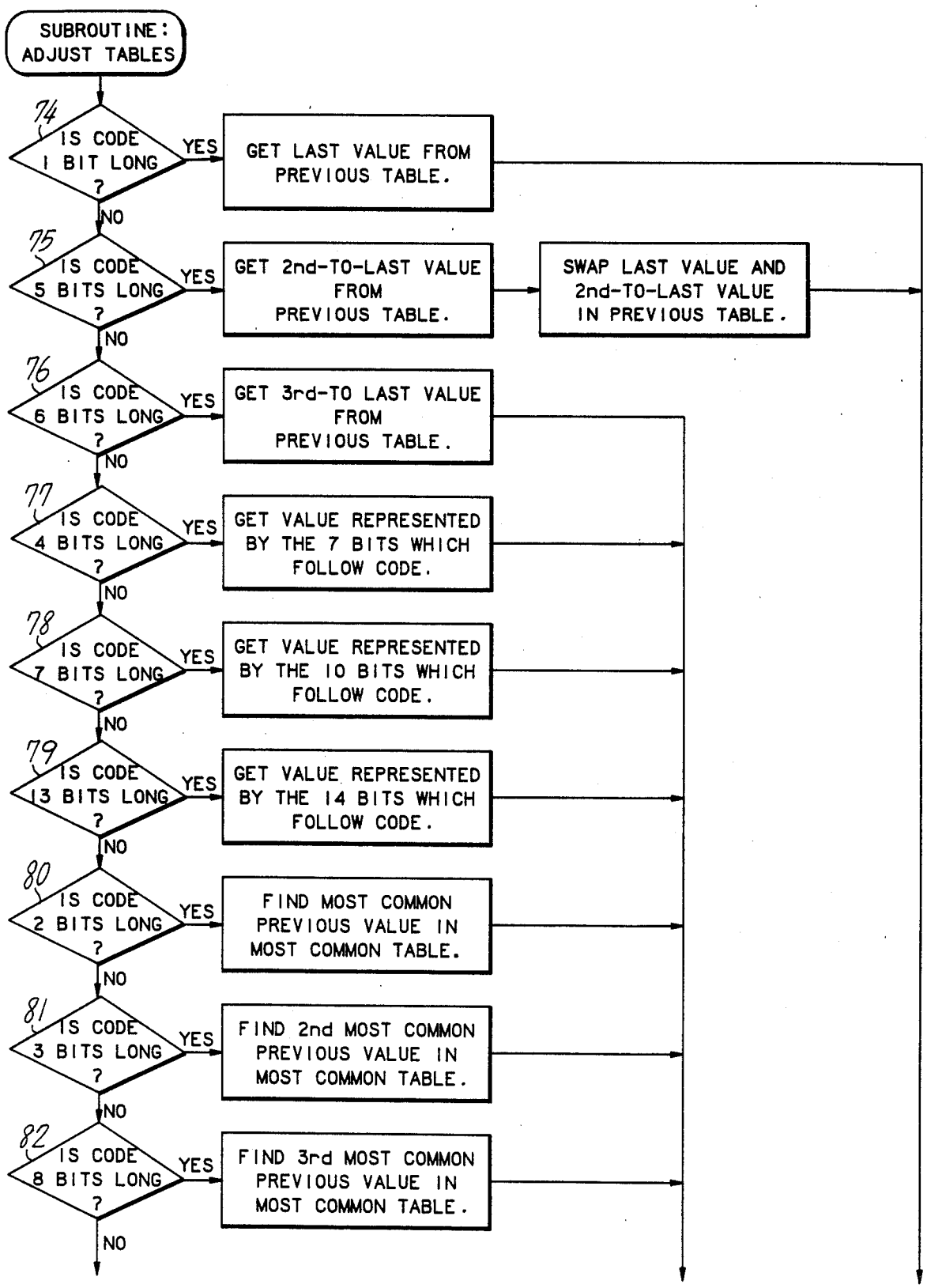
FIGS. 7A and 7B show the Adjust Tables Subroutine to the Routine of FIGS. 5A and 5B.
Figure 7B:
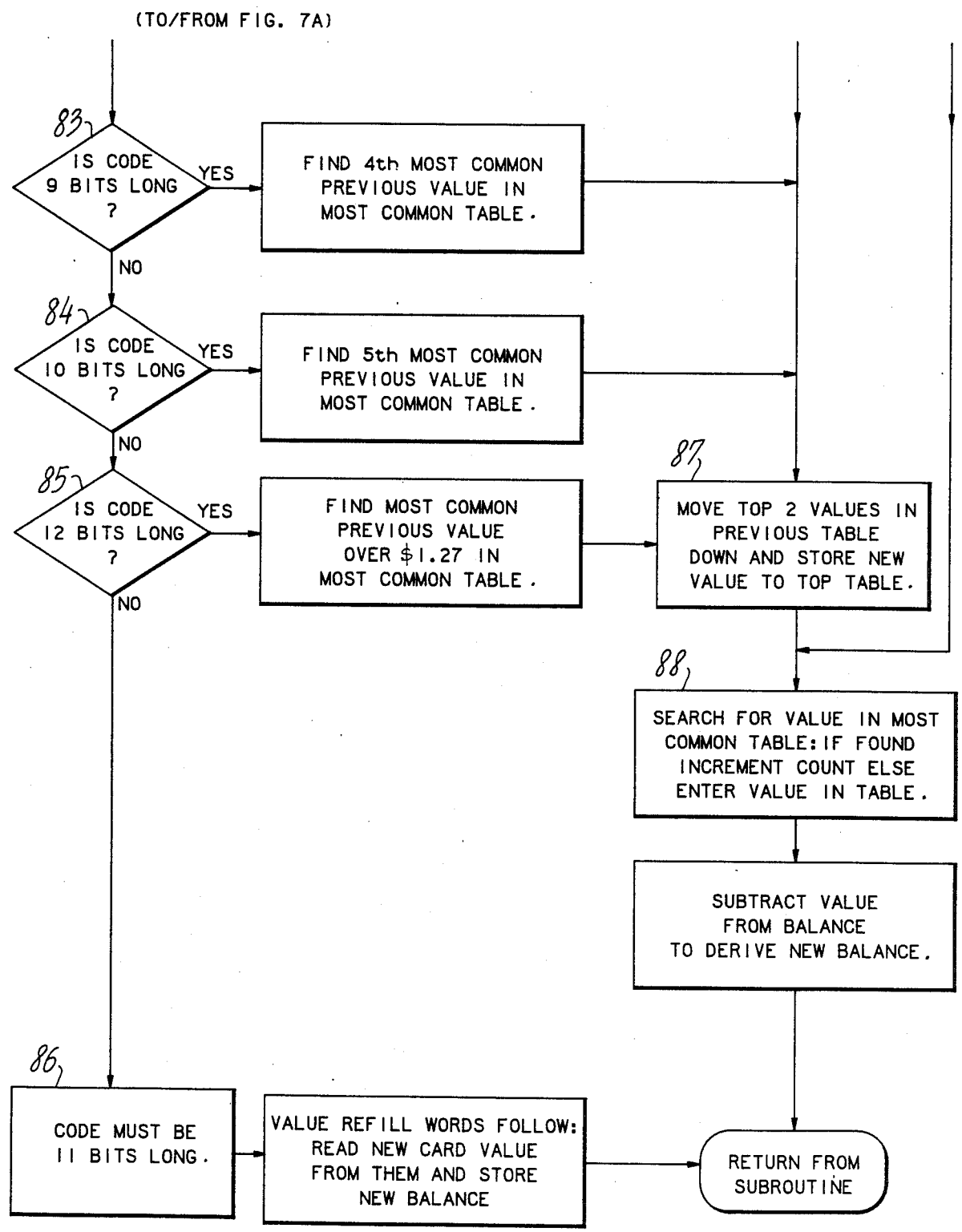

The Adjust Tables Subroutine is shown in FIGS. 7A and 7B consisting of tests at blocks 74–85 for the bit-length of the prefix code as previously determined for the currently requested (or parsed) value. The indexed previous value on the tables is then found corresponding to the prefix code.

For prefix codes other than the 1-bit, 5-bit, or 11-bit codes, the Previous Table is then updated at block 87 by reordering the current value first and the other values so that they are listed in order of last occurrence. For the 5-bit code, the Previous Table is updated by swapping the positions of the last value and the second-to-last value.

The Most Common Table is also updated at block 88 to increment the count of any indexed value, any previously listed but unindexed value, or to add the current value (not previously listed) to the listing. The table is resorted based upon the updated counts by order of commonness. The current value is then subtracted from the balance to update the available balance. If the 11-bit prefix code has been parsed, indicating that a refill of the card's value has been recorded, the refill amount is read from the following word spaces of the data trail as the new available balance. This allows the tables parsed from the data trail to continue to be used with the new balance. Alternatively, if the common or previous values are expected to change, such as after a change of postal rates, the tables can be cleared when the refill amount is read. At the end of this subroutine, processing returns to the Data Compaction Routine.

Figure 8B:
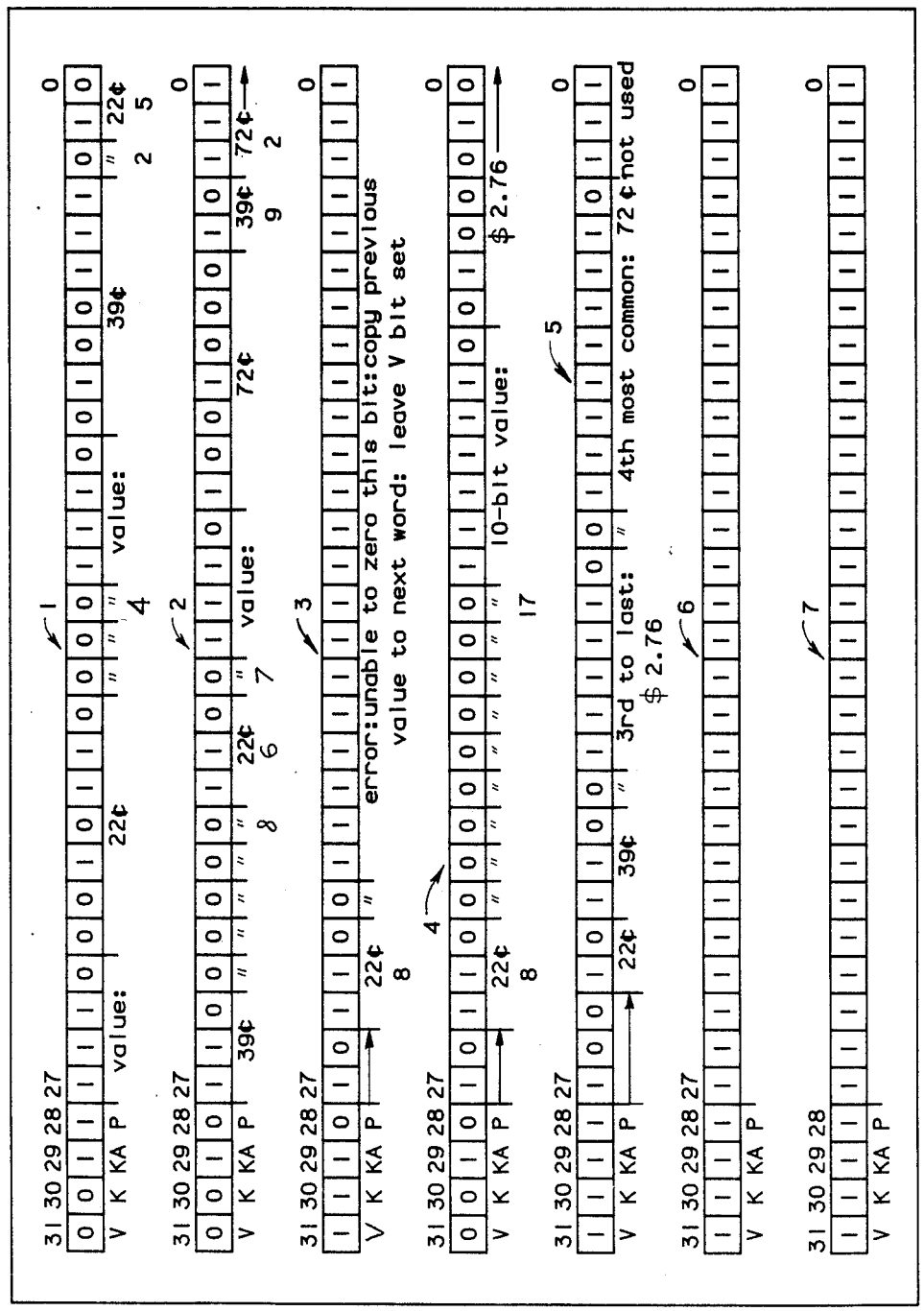
FIG. 8B shows the recorded data trail corresponding to the purchases of FIG. 8A.

An example of a series of postage purchases is shown in FIG. 8A, and the corresponding recorded data trail is shown in FIG. 8B. In the first word space (1) of FIG. 8B, for the first purchase of 22 cents, the 4-bit prefix "1110" is used to signal that 7 binary bits of value follow representing the decimal value 22. The next three purchases of the same value, 22 cents each, are recorded using the single-bit prefix "0". The numbers below the word space representation indicate the total count of that value occurring in the data trail to that point and corresponds to the count which is maintained in the Most Common Table.

The next purchase of 39 cents is a value which has not previously occurred, and is unindexed on the tables, and therefore the 4-bit prefix (for 7 bits of value) is again used followed by the value expressed in binary bits. A following purchase of the same value of 39 cents is recorded by the single-bit prefix. The next purchase of 22 cents is indexed as the Most Common Value, and is thus recorded with the 2-bit prefix "10". This completes the first word space, and recording continues at the leftmost data bit 27 of the second word space (2).

The next purchase of 39 cents is indexed as the second Most Common Value with the prefix "110", and five of the same following purchases are recorded each with the single-bit prefix. At this point the total of 39 cent purchases is 8, and 22 cent purchases is 5. Therefore, the next purchase of 22 cents is recorded with the second Most Common Value prefix, and the same following purchase by the single-bit prefix. The next purchase of 72 cents is recorded with the 4-bit (new 7-bit value) prefix, followed by a 39 cent purchase with the 2-bit (Most Common Value) prefix. A subsequent value of 72 cents is indexed as the 5-bit second-to-last different Previous Value. Part of the prefix is written to fill in the second word space and the remaining bits continue in the third word space (3).

The following ten purchases of 22 cents each is used to demonstrate the procedure to protect against an error when a bit fails to be written properly. For example, if the third following purchase to be recorded by the single-bit "0" fails to be written, the program copies the previously written codes to the next word space, and leaves the "V" validation bit (31) of the third word space as "1" so that the word is skipped on all future readings of the data trail. Recording then continues with the fourth word space (4). However, since the failure rate of bit writing is expected to be extremely low, this feature need not be used.

The next purchase in the fourth word space of $2.76 is 10-bit value preceded by the 7-bit prefix. This is written to fill the fourth word space and wraps into the fifth word space. The Most Common Value prefix is used for the next 22 cent purchase, followed by the second Most Common Value prefix for a 39 cent purchase, a single-bit repeat code, a third-to-last different Previous Value prefix for another purchase of $2.76, a repeat code, and a fourth Most common Value code for a 72 cent purchase (the three purchases of $2.76 have overtaken the two 72 cent purchases as the third Most Common Value).

As described above, the data compaction method of the invention uses shorter bit-length prefixes in place of recurring previous values which are tracked on the Previous Value Table and the Most Common Value Table. Each currently occurring value can thus be represented and recorded serially in the optimal compressed form. Since the Previous Value Table tracks previously occurring values in the locality of the currently occurring value, the method dynamically adapts to recurrences in a local set of transactions.

The Most Common Value Table allows prefix substitution for high frequency values even if they are prior to the locality of the current value. If the commonly occurring values change over time, such as upon new postal rates, the new common values eventually overtake the prior common values, thus adapting the table to the changed values. If it desired to clear the tables immediately to have the compaction prefixes set to index values under the new rates, the available balance of the card can be revalidated as a refill value in a new sector of the transaction memory zone. In order to clear not recently used values from the Most Common Tables, a push out procedure can be implemented for one or more categories of frequency at the low end of the table.

Although a preferred embodiment of the invention has been described above, many other features, modifications and variations based upon the principles of the invention will become apparent to persons familiar with this field. It is intended that the invention described herein and all further features, modifications, and variations be included within the allowed scope of the invention, as defined in the appended claims.

I claim:

1. A data compaction method, for compressing serially occurring values in a limited memory space, comprises the steps of:
   (a) assigning a first prefix indicating a most recent previously occurring value;
   (b) assigning a second prefix indicating a most common previous value;
   (c) assigning a third prefix indicating a given number of bits allocated to encode a currently occurring value;
   (d) serially recording each occurring value in compressed form to said memory space;
   (e) parsing previously recorded data in said memory space so as to serially reconstruct the previously occurring values, and, based upon said reconstructed previously occurring values, listing a most recent previously occurring value indexed to said first prefix on a first table, and listing a most common previous value indexed to said second prefix on a second table; and
   (f) said serially recording step including recording a currently occurring value in compressed form to said memory space by (i) recording the third prefix and the currently occurring value in the given number of bits, if the currently occurring value is different from the most recent previously occurring value listed on the first table and the most common previous value listed on the second table; (ii) recording the first prefix if the currently occurring value is the same as the most recent previously occurring value of the first table; and (iii) recording the second prefix if the currently occurring value is the same as the most common previous value listed on the second table.

2. A data compaction method according to claim 1, wherein said listing step includes listing a plurality of different previous values and maintaining a count of the number of occurrences of each of said previous values on said second table, and indexing a subplurality of most common ones of said previous values to a corresponding plurality of prefixes based upon said count, including said most common previous value indexed to said second prefix, on said second table.

3. A data compaction method according to claim 1, wherein said listing step includes listing a plurality of different previously occurring values indexed to a corresponding plurality of prefixes, including said most recent previously occurring value indexed to said first prefix, on said first table.

4. A data compaction method according to claim 1, wherein said memory space comprises a plurality of binary word spaces of a predetermined length of bits, said data is serially recorded in a serial data stream in said memory space from one word space to the next, and said currently occurring value in compressed form is recorded at a current end of the recorded data stream.

5. A data compaction method according to claim 1, wherein said prefixes comprise a defined set of binary codes ending in a "0" bit each in series preceded by an increasing number of "1" bits, according to order, except for the first prefix which is a "0" bit.

6. A data compaction method according to claim 1, wherein said third assigning step includes assigning a plurality of different prefixes each to a higher numerical level of value expressed in a higher threshold number of bits, and said serially recording step includes recording one of said prefixes corresponding to the numerical level of the currently occurring value followed by the currently occurring value expressed in the corresponding threshold number of bits.

7. A data compaction method according to claim 1, further comprising assigning a designated prefix indicating a reset value, and wherein said memory space comprises a plurality of binary word spaces of a predetermined length of bits, an initial value number is written in a designated one of said word spaces, said data is serially recorded in a serial data stream in said memory space from one word space to the next following said designated word space, and said designated prefix is recorded at an end of the recorded data stream to signal termination of the recorded data stream and commencement of a new data stream.

8. A transaction system for recording serially occurring transaction values in a limited memory space, comprising:
   (a) a memory space for recording digital data coded in bits;
   (b) a microprocessor for executing a data compaction program for receiving an input series of transaction values, serially processing each value into compressed data form, and serially recording each input value in the compressed data form in said memory space, said microprocessor executing said program thereby including:
   (c) prefix assigning means for assigning at least a first prefix indicating a most recent previously recorded value and a second prefix indicating a most common previous value recorded in said memory space, and a third prefix indicating a given number of bits allocated to encode a currently input value to be recorded in said memory space;
   (d) table means for establishing a first table for listing previously recorded values, and a second table for listing common previous values;
   (e) parsing means for parsing previously recorded data in said memory space so as to serially reconstruct the previously recorded values;
   (f) listing means for listing a most recent previously recorded value indexed to said first prefix on said first table, and listing a most common previous value indexed to said second prefix on said second table, based upon said reconstructed previously recorded values; and
   (f) data compressing means for recording a currently input value in compressed form to said memory space by (i) recording the third prefix and the current value in the given number of bits, if the current value is different from the most recent previously recorded value listed on the first table and the most common previous value listed on the second table; (ii) recording the first prefix if the current value is the same as the most recent previously recorded value of the first table; and (iii) recording the second prefix if the current value is the same as the most common previous value listed on the second table.

9. A system according to claim 8, wherein said listing means includes first means for listing a plurality of different previous values and second means for maintaining a count of the number of occurrences of each of said previous values on said second table, and indexing means for indexing a subplurality of most common ones of said previous values to a corresponding plurality of prefixes based upon said count, including said most common previous value indexed to said second prefix, on said second table.

10. A system according to claim 8, wherein said listing means includes first means for listing a plurality of different previously recorded values indexed to a corresponding plurality of prefixes, including said most recent previously recorded value indexed to said first prefix, on said first table.

11. A system according to claim 8, wherein said memory space comprises a plurality of binary word spaces of a predetermined length of bits, said data being serially recorded in a serial data stream in said memory space from one word space to the next, and said current value in compressed form is recorded at a current end of the recorded data stream.

12. A system according to claim 8, wherein said prefixes comprise a defined set of binary codes ending in a "0" bit each in series preceded by an increasing number of "1" bits, according to order, except for the first prefix which is a "0" bit.

13. A system according to claim 8, wherein said prefix assigning means includes means for assigning a plurality of different prefixes each to a higher numerical level of value expressed in a higher threshold number of bits, and said data compressing means includes means for recording one of said prefixes corresponding to the numerical level of the currently input value followed by the currently input value expressed in the corresponding threshold number of bits.

14. A system according to claim 8, further comprising a card incorporating said memory space and having writing means for writing transaction values in said memory space, and a transaction terminal having a slot for receiving said card therein, contacts for establishing a connection to read and/or write to said memory space of said card, input means for inputting requested transactions of given transaction values to said terminal, a microprocessor for processing a requested transaction input to said terminal by effecting recording the corresponding transaction value for the requested transaction in said memory space of said card, and dispensing means operated by said microprocessor with the processed transaction for dispensing an item of value according to the requested transaction entered on said terminal.

15. A system according to claim 14, wherein said card incorporates said microprocessor, said writing means of said card including initial value means for writing an initial numerical value assigned to account of said card, said input means of said terminal inputting requested transactions of given numerical values, said parsing means of said microprocessor of said terminal including computing means for computing an available balance of ssaid card by subtracting the reconstructed previously recorded numerical values from the initial numerical value of said card, and said processing means of said terminal including means for determining if said computed available balance of said card is sufficient to allow processing of a requested transaction of a given numerical value.

16. A system according to claim 15, wherein said prefix assigning means of said microprocessor of said terminal includes means for assigning a designated prefix indicating a refill numerical value, and wherein said memory space comprises a plurality of binary word spaces of a predetermined length of bits, the initial numerical value is written in a designated one of said word spaces, said data is serially recorded in a serial data stream in said memory space from one word space to the next following said designated word space, and said designated prefix is recorded at an end of the recorded data stream to signal termination of the recorded data stream and commencement of a new data stream associated with said refill numerical value.

17. A system according to claim 15, wherein said terminal is a postage metering terminal, and said dispensing means thereof is a printer for printing a requested postage.

* * * * *